United States Patent
Yadav et al.

(10) Patent No.: US 10,789,913 B2
(45) Date of Patent: Sep. 29, 2020

(54) ARBITRARY BLOCK RENDERING AND DISPLAY FRAME RECONSTRUCTION

(71) Applicant: QUALCOMM Incorporated, San Diego, CA (US)

(72) Inventors: Rajesh Yadav, Hyderabad (IN); Dileep Marchya, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 15/862,227

(22) Filed: Jan. 4, 2018

(65) Prior Publication Data
US 2019/0206111 A1 Jul. 4, 2019

(51) Int. Cl.
| | |
|---|---|
| G09G 5/36 | (2006.01) |
| G06T 1/20 | (2006.01) |
| G09G 5/00 | (2006.01) |
| G06F 9/50 | (2006.01) |
| G06T 1/60 | (2006.01) |
| G09G 5/393 | (2006.01) |

(52) U.S. Cl.
CPC .......... *G09G 5/363* (2013.01); *G06F 9/5044* (2013.01); *G06T 1/20* (2013.01); *G06T 1/60* (2013.01); *G09G 5/001* (2013.01); *G09G 5/36* (2013.01); *G09G 5/393* (2013.01); *G09G 2310/04* (2013.01); *G09G 2320/103* (2013.01); *G09G 2320/106* (2013.01); *G09G 2360/18* (2013.01)

(58) Field of Classification Search
CPC .................................................. G06T 15/005
See application file for complete search history.

(56) References Cited

U.S. PATENT DOCUMENTS

| | | | | |
|---|---|---|---|---|
| 5,784,074 | A | * | 7/1998 | Okawa .................. G09G 5/346 345/555 |
| 6,028,596 | A | * | 2/2000 | Oka ........................ G09G 5/24 345/555 |
| 6,388,669 | B2 | | 5/2002 | Minami et al. |
| 7,895,411 | B2 | | 2/2011 | Maher et al. |
| 8,358,876 | B1 | | 1/2013 | Gilra et al. |
| 9,053,562 | B1 | | 6/2015 | Rabin et al. |

(Continued)

FOREIGN PATENT DOCUMENTS

EP 2508986 A1 10/2012

OTHER PUBLICATIONS

Amadeo, "Getting to Know Android 4.1, Part 3: Project Butter—How It Works and What It Added," accessed from https://www.androidpolice.com/2012/07/12/getting-to-know-android-4-1-part-3-project-butter-how-it-works-and-what-it-added/, Jul. 12, 2012, 11 pp.

(Continued)

*Primary Examiner* — Phi Hoang
(74) *Attorney, Agent, or Firm* — Campbell C. Chiang; Shumaker & Sieffert P.A.

(57) ABSTRACT

Techniques of this disclosure may include ways to control the amount of graphics data a graphics processing unit (GPU) renders. The GPU may render graphics data for image content that changed from frame-to-frame rather than graphics data for image content that changed and did not change. To display the image content, processing circuitry may map locations of where the graphics data is stored to lines in the image content allowing for the GPU to store the graphics data in arbitrary locations of an application buffer.

18 Claims, 6 Drawing Sheets

(56) References Cited

U.S. PATENT DOCUMENTS

| | | | |
|---|---|---|---|
| 9,251,607 B1 | 2/2016 | Milne et al. | |
| 2003/0174234 A1* | 9/2003 | Kondo | H04N 5/2353 348/362 |
| 2005/0105608 A1* | 5/2005 | Coleman | H04N 19/137 375/240.01 |
| 2007/0188506 A1* | 8/2007 | Hollevoet | G06T 1/60 345/530 |
| 2008/0055325 A1* | 3/2008 | Seigneret | G09G 5/39 345/538 |
| 2011/0283227 A1* | 11/2011 | Moore | G06F 3/0481 715/800 |
| 2012/0102392 A1* | 4/2012 | Reesman | G06F 16/9577 715/243 |
| 2018/0097865 A1* | 4/2018 | Song | H04L 65/602 |

OTHER PUBLICATIONS

"SurfaceFlinger and Hardware Composer," accessed from https://source.android.com/devices/graphics/arch-sf-hwc, last updated Mar. 27, 2017, 5 pp.

International Search Report and Written Opinion—PCT/US2018/066406—ISA/EPO—dated Apr. 10, 2019 (21 pp).

* cited by examiner

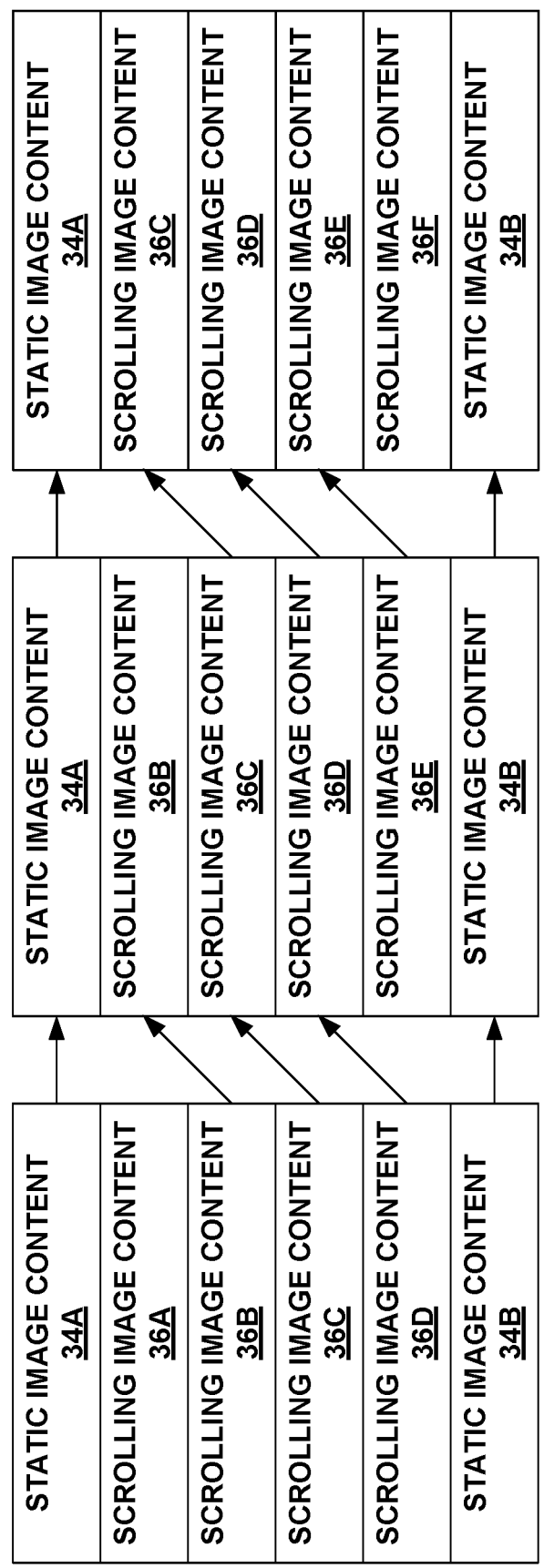

ARBITRARY BLOCK RENDERING AND DISPLAY FRAME RECONSTRUCTION

TECHNICAL FIELD

The disclosure relates to graphics processing and graphics data storage.

BACKGROUND

Computing devices often utilize a graphics processing unit (GPU) to accelerate the rendering of graphics data for display, and a display processor to generate the signal that drives a display panel. Such computing devices may include, e.g., computer workstations, mobile phones such as so-called smartphones, embedded systems, personal computers, tablet computers, and video game consoles. GPUs typically execute a graphics processing pipeline that includes a plurality of processing stages which operate together to execute graphics processing commands. A host central processing unit (CPU) may control the operation of the GPU by issuing one or more graphics processing commands to the GPU. The display processor retrieves image content generated by the GPU and further processes the image content to generate the signal to drive the display panel to cause the display to present the image content.

SUMMARY

In general, aspects of the disclosure are directed to techniques for controlling the amount of graphics data generated by a graphics processing unit (GPU) based on portions of an application buffer that store obsolete data corresponding to image content that is no longer displayed, and portions of the application buffer that store valid data corresponding to image content that is displayed but is associated with new lines on a display panel. The GPU may render graphics data corresponding to image content that is newly displayed, rather than re-render all graphics data. The GPU may store graphics data corresponding to the newly displayed image content in the portions of the application buffer that store the obsolete data.

Processing circuitry may generate information indicating which lines of image content are associated with which portions of the application buffer. For example, the mapping may indicate that graphics data stored in a first portion of the application buffer corresponds to image content that is displayed immediately above image content that corresponds to graphics data stored in a second portion of the application buffer. A display processor may then cause the display panel to display the image content based on the information indicating which portions in the application buffer correspond to which lines of the image content.

In one example, the disclosure describes a method for generating image content, the method comprising determining an amount of displacement of image content relative to a position of the image content in a displayed first frame, determining a portion of an application buffer having obsolete data based on the determined displacement of the image content, wherein the obsolete data is data stored in the application buffer for image content that is no longer to be displayed, and instructing a graphics processing unit (GPU) to render graphics data for image content of a second frame that is different than the image content of the first frame to the determined portion of the application buffer without causing the GPU to re-render graphics data for image content of the second frame that is the same as image content of the first frame.

In one example, the disclosure describes a device for generating image content, the device comprising an application buffer, a graphics processing unit (GPU), and processing circuitry. The processing circuitry is configured to determine an amount of displacement of image content relative to a position of the image content in a displayed first frame, determine a portion of the application buffer having obsolete data based on the determined displacement of the image content, wherein the obsolete data is data stored in the application buffer for image content that is no longer to be displayed, and instruct the GPU to render graphics data for image content of a second frame that is different than the image content of the first frame to the determined portion of the application buffer without causing the GPU to re-render graphics data for image content of the second frame that is the same as image content of the first frame.

In one example, this disclosure describes computer-readable storage medium storing instructions that when executed cause one or more processors to determine an amount of displacement of image content relative to a position of the image content in a displayed first frame, determine a portion of an application buffer having obsolete data based on the determined displacement of the image content, wherein the obsolete data is data stored in the application buffer for image content that is no longer to be displayed, and instruct a graphics processing unit (GPU) to render graphics data for image content of a second frame that is different than the image content of the first frame to the determined portion of the application buffer without causing the GPU to re-render graphics data for image content of the second frame that is the same as image content of the first frame.

In one example, the disclosure describes a device for generating image content, the device comprising means for determining an amount of displacement of image content relative to a position of the image content in a displayed first frame, means for determining a portion of an application buffer having obsolete data based on the determined displacement of the image content, wherein the obsolete data is data stored in the application buffer for image content that is no longer to be displayed, and means for instructing a graphics processing unit (GPU) to render graphics data for image content of a second frame that is different than the image content of the first frame to the determined portion of the application buffer without causing the GPU to re-render graphics data for image content of the second frame that is the same as image content of the first frame.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 2A-2C are conceptual diagrams illustrating examples of scrolling image content as part of a graphical user interface (GUI).

DETAILED DESCRIPTION

Figure 1:
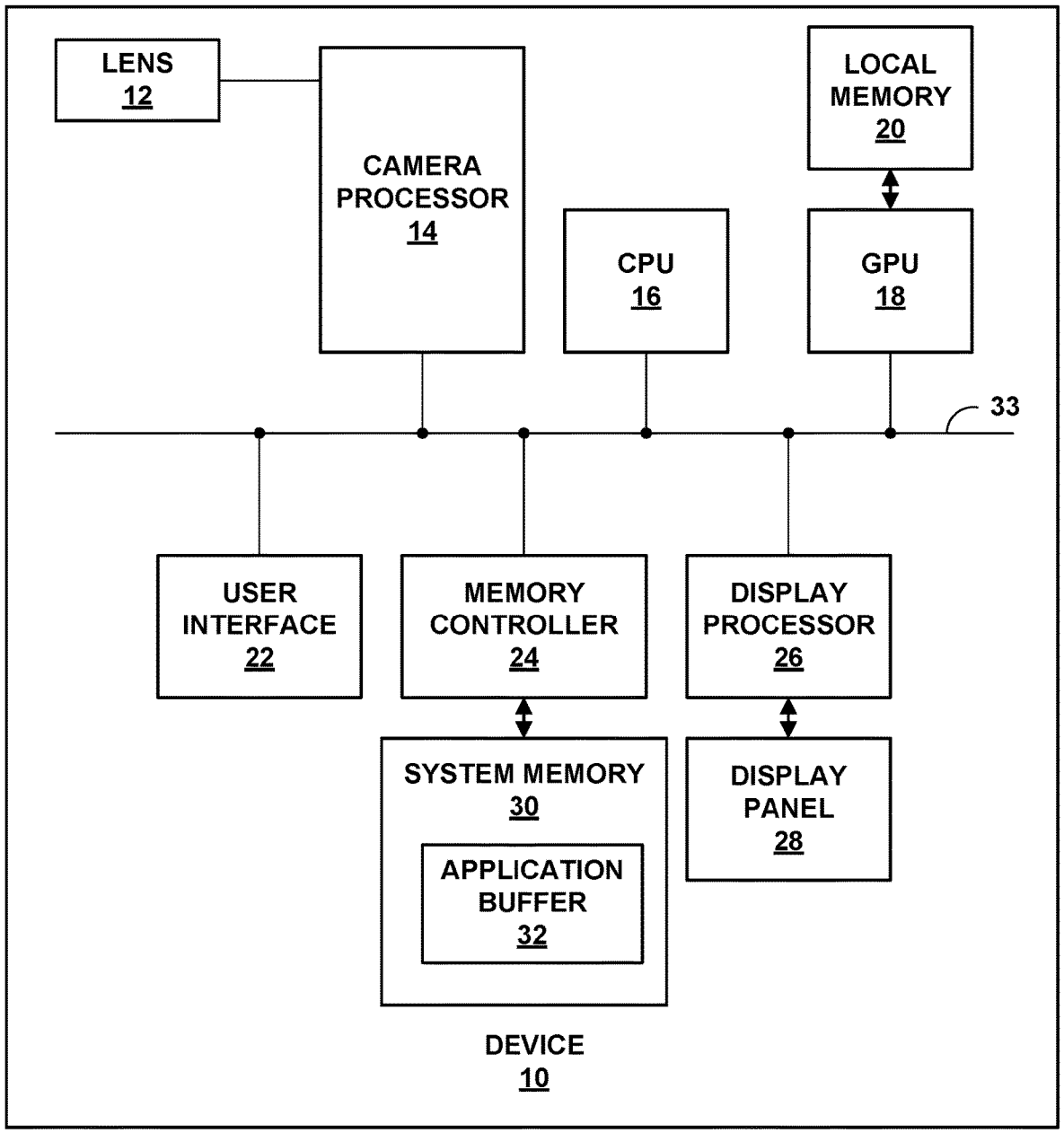
FIG. 1 is a block diagram illustrating an example computing device that may be configured to implement one or more examples of this disclosure.

Example techniques are described for controlling the amount of graphics data a graphics processing unit (GPU) generates. The GPU may be configured to render (e.g., generate) graphics data that the GPU stores in an application buffer. A display processor may retrieve the graphics data from the application buffer and generate image content of a frame for display. The rate at which the display processor generates the image content is referred to as a display refresh rate.

From frame-to-frame, some of the image content on the display panel may change and some image content may be the same. However, the image content that is the same from frame-to-frame may be in a different location on the display panel. For example, if a user is scrolling image content upward, then from frame-to-frame, some of the image content on the top of the display panel is not displayed, some of the image content in the middle of the display panel may move upward, and image content at the bottom is replaced with new image content.

As described in more detail, in some examples, rather than re-rendering all graphics data frame-to-frame, the GPU may be configured to render graphics data only for portions of the frame that are new from frame-to-frame. Accordingly, the graphics data for the entire frame may be available more quickly because the GPU rendered graphics data only for the portions with new image content. Moreover, the display processor may complete generating image content to refresh the display panel within a specified time. The more quickly the GPU completes rendering image content, the more time the display processor has to complete rendering within the specified time. If there are GPU delays, the display processor may repeat old content which can be avoided if the GPU is able to generate the graphics data earlier.

For example, when a user interacts with a graphical user interface (GUI), the user tends to displace image content relatively uniformly. A lot of user interactions result in left, right, top, or bottom content displacement. For an enriched user experience, user interface (UI) transitions (e.g., frame-to-frame changes in the image content), in response to user actions, have a high frame-per-second (fps) demand. GPU and display processors may operate at maximum throughput (e.g., maximum fps) to fulfill such a demand. In addition, display stutters may occur if any of the components in the entire pipeline of the GPU or display processor are not able to handle the throughput due to various other system loads.

Accordingly, techniques to limit the amount of graphics data the GPU renders frame-to-frame may address issues present in graphics processing technology. For example, a device having a GPU that re-renders graphics data for the entire frame, rather than graphics data for those portions having new image content, may complete the rendering of a frame more slowly than the example GPUs described in this disclosure.

However, having the GPU render graphics data only for the portions of the image frame with new image content may cause issues. For example, the display processor may rely upon the manner in which the graphics data is arranged in the application buffer to generate the image content. As an example, to refresh the display panel, the display processor may write image content line-by-line on the display panel. The order in which the graphics data is stored in the application buffer may indicate the order in which the corresponding image content is arranged on the display panel.

For example, the graphics data may be stored in memory locations of the application buffer having contiguous virtual addresses. The display processor may generate the image content line-by-line based on the storage of graphics data in the contiguous virtual addresses. As an example, the display processor generates image content for the top based on graphics data stored in the memory location having the first virtual address, generates image content below the top based on graphics data stored in the memory locations having the second virtual address, and so forth. The display processor may refresh the display panel by reading in lines of graphics data from the application buffer, generating the image content for those lines based on the graphics data, and then displaying the image content.

In examples where the GPU renders graphics data that corresponds to the new image content of a frame, there may be misalignment between where the graphics data is stored in the application buffer and the arrangement of the corresponding image content on the display panel. As an example, assume that the display panel is displaying frame one and the user displaces the image content upwards. The GPU, in turn, renders graphics data for frame two, where image content is displaced upwards, and the display processor generates and causes the display panel to display the image content for frame two. In this example, the graphics data for frame one stored at the top of the application buffer (e.g., at virtual addresses corresponding to the top of the image content) becomes obsolete since that portion of frame one is no longer displayed. The image content at the top of frame two is located in memory locations identified in the middle range of the virtual addresses, and the image content in the middle of frame two is located in memory locations identified in the bottom range of the virtual addresses.

If the display processor were to read the graphics data based on contiguous virtual addresses, and arrange the image content generated from the graphics data accordingly, the display panel may display image content in the incorrect location. For example, image content that is to be displayed at the top in frame two would be displayed in the middle because virtual addresses for the image content that should be at the top are in the middle range of the virtual addresses for the application buffer.

In one or more examples, processing circuitry may generate information that indicates from where the display processor is to read graphics data so that the display processor generates image content for the display panel in the correct arrangement. For example, the processing circuitry may generate information (e.g., in the form of a GPU pixel block table) that maps which image lines of image content are associated with which portions of the application buffer. The display processor may use the generated information to determine from where to read the graphics data when generating image content for the display panel.

Furthermore, as described in more detail, in some examples, in addition to a GPU pixel block table that indicates mapping between graphics data rendered by the GPU and arrangement of corresponding image content, the processing circuitry may maintain another display pixel block table similar to the GPU pixel block table. Because the display processor operates on different layers, the display processor may also utilize the display pixel block table for compositing and generating the image content.

FIG. 1 is a block diagram of a device 10 configured to perform one or more of the example techniques described in this disclosure. Examples of device 10 include a computer (e.g., personal computer, a desktop computer, or a laptop computer), a mobile device such as a tablet computer, a wireless communication device (such as, e.g., a mobile telephone, a cellular telephone, a satellite telephone, and/or a mobile telephone handset), a landline telephone for teleconferencing, an Internet telephone, a handheld device such as a portable video game device or a personal digital assistant (PDA). Additional examples of device 10 include a personal music player, a video player, a display device, a camera, a television, a set-top box, a broadcast receiver device, a server, an intermediate network device, a mainframe computer or any other type of device that processes and/or displays graphical data. For purposes of description, the examples are described with respect to device 10 being an automobile with the understanding that the examples may be extended to other examples of device 10.

As illustrated in the example of FIG. 1, device 10 includes lens 12, camera processor 14, a central processing unit (CPU) 16, a graphical processing unit (GPU) 18 and local memory 20 of GPU 18, user interface 22, memory controller 24 that provides access to system memory 30, and display processor 26 that outputs signals that cause graphical data to be displayed on display panel 28. As shown in FIG. 1, system memory 30 includes application buffer 32. Bus 33 provides the interconnection of the various components.

Although the various components are illustrated as separate components, in some examples, the components may be combined to form a system on chip (SoC). As an example, camera processor 14, CPU 16, GPU 18, and display processor 26 may be formed on a common integrated circuit (IC) chip. In some examples, one or more of camera processor 14, CPU 16, GPU 18, and display processor 26 may be in separate IC chips. Various other permutations and combinations are possible, and the techniques should not be considered limited to the example illustrated in FIG. 1.

The various components illustrated in FIG. 1 (whether formed on one device or different devices) may be formed as at least one of fixed-function or programmable processing circuitry such as in one or more microprocessors, application specific integrated circuits (ASICs), field programmable gate arrays (FPGAs), digital signal processors (DSPs), or other equivalent integrated or discrete logic circuitry. Examples of local memory 20 include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), flash memory, a magnetic data media or an optical storage media.

The various units illustrated in FIG. 1 communicate with each other using bus 33. Bus 33 may be any of a variety of bus structures, such as a third-generation bus (e.g., a HyperTransport bus or an InfiniBand bus), a second-generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different components shown in FIG. 1 is merely exemplary, and other configurations of computing devices and/or other image processing systems with the same or different components may be used to implement the techniques of this disclosure.

Display panel 28 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display panel 28 may be integrated within computing device 10. For instance, display panel 28 may be a touch or presence-sensitive screen of a mobile telephone handset or a tablet computer. Alternatively, display panel 28 may be a stand-alone device coupled to computing device 10 via a wired or wireless communications link. For instance, display panel 28 may be a computer monitor or flat panel display connected to a personal computer via a cable or wireless link.

User interface 22 is used in this disclosure to generically refer to a device or devices by which a user may interact with device 10. Examples of user interface 22 includes a trackball, a mouse, a keyboard, and the like. In some examples, user interface 22 may be part of display panel 28, such as in examples where display panel 28 is a touchscreen device.

Camera processor 14, CPU 16, and GPU 18 may be configured to generate data that display processor 26 uses to generate image content for display by display panel 28. For example, camera processor 14 is configured to receive electrical currents as sensor signals from respective pixels of a sensor that receives imagery via lens 12 and process the electrical currents to generate pixel data of images. Camera processor 14 may be configured as a single-input-multiple-data (SIMD) architecture. Camera processor 14 may perform the same operations on current received from each of the sensors associated with lens 12. Each lane of the SIMD architecture may include an image pipeline. The image pipeline includes hardwire circuitry and/or programmable circuitry (e.g., at least one of fixed-function or programmable circuitry) to process the output of the sensors to generate pixel values for pixels to be in a displayed image.

CPU 16 may comprise a general-purpose or a special-purpose processor that controls operation of device 10. A user may provide input to device 10 to cause CPU 16 to execute one or more software applications. The software applications that execute on CPU 16 may include, for example, a graphical user interface application or another program. As an example, CPU 16 may execute one or more software applications that generate image content for icons shown on display panel 28. As another example, CPU 16 may execute an application that generates text for a user to read, such as a web browser application. As another example, CPU 16 may execute an application that shows text messages received and stored on device 10.

The above example applications that CPU 16 executes are examples where CPU 16 generates data for image content for display. However, there may be other example applications that CPU 16 executes that do not generate data for image content such as the operating system. Furthermore, rather than executing applications to generate the data for image content, CPU 16 may be hardwired to generate the data for the image content.

There may be various combinations and permutations of using fixed-function and programmable circuitry for CPU 16 to generate data for image content that is to be displayed on display panel 28. The above provide some examples, and such examples should not be considered limiting.

The software applications that execute on CPU 16 may include one or more graphics rendering instructions that instruct GPU 18 to cause the rendering of graphics data for storage in system memory 30. In some examples, the software instructions may conform to a graphics application programming interface (API), such as, e.g., an Open Graphics Library (OpenGL®) API, an Open Graphics Library Embedded Systems (OpenGL ES) API, an OpenCL API, a Direct3D API, an X3D API, a RenderMan API, a WebGL API, or any other public or proprietary standard graphics API. The techniques should not be considered limited to requiring a particular API.

Memory controller 24 facilitates the transfer of data going into and out of system memory 30. For example, memory controller 24 may receive memory read and write commands, and service such commands with respect to memory 30 in order to provide memory services for the components in computing device 10. Memory controller 24 is communicatively coupled to system memory 30. Although memory controller 24 is illustrated in the example of device 10 of FIG. 1 as being a processing circuit that is separate from both CPU 16 and system memory 30, in other examples, some or all of the functionality of memory controller 24 may be implemented on one or both of CPU 16 and system memory 30.

System memory 30 may store program modules and/or instructions and/or data that are accessible by camera processor 14, CPU 16, GPU 18, and display processor 26. For example, system memory 30 may store user applications (e.g., gaming applications), resulting images from GPU 18, etc. System memory 30 may additionally store information for use by and/or generated by other components of device 10. For example, system memory 30 may act as a device memory for camera processor 14, CPU 16, GPU 18, and display processor 26. System memory 30 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some examples, system memory 30 may include instructions that cause camera processor 14, CPU 16, GPU 18, and display processor 26 to perform the functions ascribed to these components in this disclosure. Accordingly, system memory 30 may be a computer-readable storage medium having instructions stored thereon that, when executed, cause one or more processors (e.g., camera processor 14, CPU 16, GPU 18, and display processor 26) to perform various functions.

In some examples, system memory 30 is a non-transitory storage medium. The term "non-transitory" indicates that the storage medium is not embodied in a carrier wave or a propagated signal. However, the term "non-transitory" should not be interpreted to mean that system memory 30 is non-movable or that its contents are static. As one example, system memory 30 may be removed from computing device 10, and moved to another device. As another example, memory, substantially similar to system memory 30, may be inserted into computing device 10. In certain examples, a non-transitory storage medium may store data that can, over time, change (e.g., in RAM).

Camera processor 14, CPU 16, and GPU 18 may store image data, and the like in respective buffers that are allocated within system memory 30. Display processor 26 may retrieve the data from system memory 30, and process the data to generate image content. Display processor 26 may configure display panel 28 to display the image content represented by the data generated by camera processor 14, CPU 16, and GPU 18. In some examples, display processor 26 may include a digital-to-analog converter (DAC) that is configured to convert the digital values retrieved from system memory 30 into an analog signal consumable by display panel 28. Display processor 26 may generally perform filtering, rotating, and other such example operations to process the data stored in memory 30, and to generate the image content for display on display panel 28. In other examples, display processor 26 may pass the digital values directly to display panel 28 for processing.

In some examples, display processor 26 may composite data from different data sources (e.g., camera processor 14, CPU 16, and/or GPU 18) to generate a composite image frame for display on display panel 28. For instance, the data generated by each one of camera processor 14, CPU 16, and/or GPU 18 may correspond to different layers. Also, one layer may be for a first application that CPU 16 executes that causes GPU 18 to generate a first set of graphics data, and another layer may be for a second application that CPU 16 executes that causes GPU 18 to generate a second set of graphics data. Display processor 26 may retrieve the data for each of the layers, and blend or stitch the layers together to form a composite image frame that display panel 28 displays.

As an example, CPU 16 may execute a first application that causes GPU 18 to render graphics data for the current battery life and connectivity strength. CPU 16 may execute a second application that causes GPU 18 to generate information about received short message service (SMS) texts. The graphics data for the current battery life and the connectivity strength may form a first layer, and the graphics data for the SMS texts may form a second layer. In this example, display processor 26 may stitch the first layer and the second layer together to form a composite frame. For example, assume that the first layer is displayed at the top of display panel 28, and the second layer is displayed below the first layer. In this example, display processor 26 may stitch the second layer to the bottom of the first layer to form a composite frame. Accordingly, display processor 26 may include processing circuitry such as blending and stitching circuitry to composite layers together and form a composite frame.

As described above, GPU 18 generates graphics data that is stored in system memory 30. As one example, system memory 30 includes an application buffer 32, and GPU 18 stores graphics data in the application buffer 32. Display processor 26 retrieves graphics data from the application buffer 32 and generates the image content for display on display panel 28.

The rate at which display processor 26 generates and causes image content to be displayed on display panel 28 is referred to as the display refresh rate. As one example, display processor 26 may generate image content at 60 frames per second (fps). The rate at which display processor 26 generates image content may be based on various factors such as the manner in which the user is interacting with device 10, the type of image content display panel 28 is displaying, etc.

As one example, display panel 28 may display a graphical user interface (GUI). The user may interact with the GUI such as by scrolling the image content up or down (e.g., displacing image content). For good user experience, display processor 26 may refresh display panel 28 at a relatively high refresh rate. For example, good user experience for scrolling is when the image content appears to seamlessly scroll on display panel 28, rather than scroll in stutters. To achieve such seamless scrolling, display processor 26 may refresh display panel 28 at a relatively high display refresh rate with new image content.

Because display processor 26 may refresh display panel with new image content at the relatively high display refresh rate, GPU 18 may render graphics data at a relatively high rate so that display processor 26 can achieve the high display refresh rate. For example, during normal operation, display processor 26 may refresh display panel 28 at 30 fps, and GPU 18 may render graphics data at a first throughput rate so that display processor 26 can achieve the 30 fps display refresh rate. When a user is scrolling image content on display panel 28, display processor 26 may refresh display panel 28 at 120 fps to achieve an appearance of a seamless scroll. Accordingly, GPU 18 may render graphics data at a second throughput rate so that display processor 26 can achieve the 120 fps display refresh rate, where the second throughput rate at which GPU 18 is operating for 120 fps display refresh rate is much greater than the first throughput rate at which GPU 18 is operating for 30 fps display refresh rate.

Causing GPU 18 and display processor 26 to operate at high throughput rates consumes power, resulting in power drain. Also, due to various system loads, it may not be possible to cause GPU 18 and display processor 26 to operate at high throughput rates. This may result in display stutter if any component in GPU 18 or display processor 26 is not able to handle the high throughput rate.

In one or more examples described in this disclosure, rather than GPU 18 generating graphics data for the entire frame, GPU 18 may be configured to render graphics data for one or more portions of an image frame that changed frame-to-frame. In this way, GPU 18 may render less graphics data as compared to if GPU 18 re-rendered both the graphics data that changed from frame-to-frame and the graphics data that did not change from frame-to-frame As an example, display panel 28 displaying image content may receive user interaction to displace the image content. In response, some of the previous image content is no longer visible, some new image content is added, some of the previous image content is displaced (e.g., same image content but in different location), and some of the previous image content stays the same (e.g., same image content in same location). For instance, assume that the user scrolls image content upward. In this case, the top part of the image content is off display panel 28 and no longer visible, and there is new image content at the bottom of display panel 28. All other image content is displaced upwards on display panel 28.

In this example, GPU 18 may be configured to render graphics data for the portion of the frame that corresponds to the bottom of display panel 28. GPU 18 may not re-render the graphics data for the other portions of the frame that have the same image content, but are displaced vertically. This way, GPU 18 may not operate at a high throughput rate because there is less graphics data to render, as compared to if GPU 18 rendered all of the graphics data.

In conventional techniques, GPU 18 may re-render the graphics data for the entire frame after a scrolling operation, even though there was only a displacement of image content without much new graphics data that GPU 18 needed to render. For example, in these conventional techniques, GPU 18 may rewrite the entirety of application buffer 32 every time there is user interaction.

However, there may be reasons for having GPU 18 re-render graphics data and rewrite the graphics data in application buffer 32. Display processor 26 may retrieve the graphics data from application buffer 32 line-by-line, sequentially, and generate the image content based on the order in which the graphics data is arranged in application buffer 32. For example, memory locations of application buffer 32 may be accessible via contiguous virtual memory addresses, and display processor 26 may retrieve the graphics data sequentially based on the contiguous addressing of the graphics data.

To refresh display panel 28, display processor 26 may read graphics data for a line from application buffer 32. Display processor 26 may determine where the image content generated from the graphics data of that line is to be displayed based on the order in which the graphics data was retrieved from application buffer 32. For instance, if a first set of graphics data is stored in a memory location of application buffer 32 has a smaller virtual address than a virtual address for a memory location of application buffer 32 that stores a second set of graphics data, then display processor 26 may determine that image content corresponding to the first set of graphics data is displayed above the image content corresponding to the second set of graphics data.

In one or more example techniques described in this disclosure, because GPU 18 may render graphics data for the portion that changed frame-to-frame and not all graphics data, GPU 18 may store the graphics data at different portions in application buffer 32 so that the order in which the graphics data is stored in application buffer 32 may not necessarily be the order in which the corresponding image content of the graphics data is to be arranged. To address this, as described in more detail, CPU 16, via execution of a display driver, may instruct display processor 26 with information indicating which lines of the image content are associated with which portion of application buffer 32. This way, the graphics data generated by GPU 18 for all of the image content may not be stored with contiguous virtual addresses. However, CPU 16 may instruct display processor 26 with the mapping between lines of image content and the portions in application buffer 32 that store the corresponding graphics data.

From frame-to-frame, some of the image content that was displayed for a first frame, is no longer displayed in the second frame. For instance, for a scrolling movement, the image content on the top of a first frame is no longer visible when displaying image content of the second frame. For the first frame, application buffer 32 may store graphics data that corresponds to the image content at the top of first frame. Then, for the second frame, application buffer 32 may store obsolete data. For example, the graphic data that corresponds to the image content for the top of the first frame is now obsolete. Obsolete data is data stored in application buffer 32 for image content that is no longer to be displayed.

In some examples, GPU 18 may store the newly rendered graphics data for the second frame in portions of application buffer 32 that store obsolete data. For instance, if after user interaction, X lines of image content of the first frame are no longer visible, then there would be X lines of the new image content of the second frame that are visible. Therefore, the portion of application buffer 32 that stored the graphics data corresponding to the X lines of image content of the first frame (e.g., the obsolete data) may be the exact size needed to store the graphics data corresponding to the X lines of image content of the second frame.

In this manner, GPU 18 may be configured to store graphics data in arbitrary portions of application buffer 32 (e.g., GPU 18 may be configured for arbitrary block rendering). Again, in some conventional techniques, rather than GPU 18 storing graphics data in arbitrary portions of application buffer 32, GPU 18 would re-render all of the graphics data and store the graphics data in the order in which its corresponding image content is to be arranged. In one or more example techniques described in this disclosure, rather than re-rendering all of the graphics data, GPU 18 may render graphics data only for the portions of the second frame having the new image content. This may reduce the amount of graphics data GPU 18 renders, allowing GPU 18 to render graphics data at a relatively high throughput rate.

However, because the graphics data is stored in arbitrary portions of application buffer 32, the graphics data may not be stored in the order in which the corresponding image content is to be arranged. For example, rather than application buffer 32 storing graphics data contiguously in memory locations having contiguous addresses, application buffer 32 may store graphics data for image content in memory locations whose virtual addresses do not necessarily indicate where the image content is to be located. For instance, if the image content is to be arranged in the order of the virtual addresses, then display processor 26 may sequentially read the graphics data (e.g., start from the beginning of the virtual addresses and read until reaching the end of the virtual addresses) from application buffer 32 and generate the corresponding image content in that order.

In one or more examples described in this disclosure, because the graphics data may not be stored in the order in which the corresponding image content is to be arranged, display processor 26 may not be able to read memory locations sequentially based on their virtual addresses. For example, a first set of image content for graphics data stored in memory locations having higher virtual addresses may be displayed above a second set of image content for graphics data stored in memory locations having lower virtual addresses. But if display processor 26 arranged the image content in the order of the virtual addresses, then the second set of image content may be displayed above the first set of image content.

As described in more detail, in one or more examples, CPU 16 may generate a GPU pixel block table that indicates which lines of image content are associated with which portions of the application buffer. Display processor 26 may then read the graphics data, generate the corresponding image content, and arrange the image content in the order based on the GPU pixel block table.

As described above, GPU 18 may be configured to render graphics data corresponding to the new image frame in portions of application buffer 32 having obsolete data. In one or more examples, CPU 16 (e.g., via execution of a graphics driver) may determine a portion of application buffer 32 that stores the obsolete data. For example, CPU 16 may execute a window manager. The purpose of the window manager may be to determine how image content on display panel 28 is arranged. In response to a user displacing image content from a position of the image content in a displayed frame, the window manager may receive "scroll view" as input information. The scroll view may be information indicating the momentum of the displacement (e.g., how far and how fast the image content is displaced).

Based on the momentum, CPU 16 may determine a displacement motion vector. The displacement motion vector indicates length and direction of displacement. Based on the length and direction of displacement, CPU 16 (e.g., via the window manager) may determine how much to displace image content from its position in the frame and where to displace the image content. CPU 16 may, based on how much and where to displace the image content, determine which image content is no longer visible, and provide information to a graphics driver executing on CPU 16 identifying which image content is no longer visible and where the graphics data for this image content that is no longer visible is stored in application buffer 32. The graphics driver may then instruct GPU 18 as to what graphics content to render and where to render the graphics content in application buffer 32 so as to overwrite the obsolete data.

There may be other ways in which to determine an amount of displacement of image content relative to a position of the image content in a displayed frame, and determine a portion of application buffer 32 having obsolete data based on the determined displacement of the image content. For example, rather than using the window manager, a touch controller (not shown) of device 10 may output information of a displacement motion vector. The techniques described in this disclosure should not be considered limited to these example ways in which to determine an amount of displacement of image content relative to a position of the image content in a displayed frame, and determine a portion of application buffer 32 having obsolete data based on the determined amount of displacement.

Display processor 26 may composite (e.g., blend or stitch) the graphics data retrieved from application buffer 32 with other layers. In some examples, display processor 26 is a line-based engine, which means that display processor 26 outputs content line-by-line to display panel 28.

If display panel 28 is a video mode panel, then display panel 28 may not include its own panel memory (e.g., panel RAM). Accordingly, for such examples, display processor 26 may continuously refresh display panel 28 with the composite image frame. For instance, on each refresh cycle (e.g., each time that display panel 28 is to be refreshed with image content), display processor 26 regenerates the image content and transfers the image content line-by-line to display panel 28.

In some examples, such as examples where display panel 28 is configured as a smart display panel, display panel 28 may include its own panel memory. For such examples, the panel memory may include the display buffer. For instance, display processor 26 may store the composite frame into the display buffer line-by-line, and hardware of display panel 28 may read the image content for the composite frame from the display buffer and generate the image content for display on display panel 28. In such examples, the hardware of display panel 28 reads the image content from its display buffer and refreshes the image content on display panel 28, which may be independent of the operations of display processor 26.

In one example where the display buffer is available (e.g., command mode or smart mode), CPU 16 may determine which layers had image content that changed from composite frame to composite frame. For example, GPU 18 may use application buffer 32 to map how the graphic data corresponding to the image content for a particular application is to be arranged. However, there may be a plurality of applications each generating their own respective layers that display processor 26 composites.

CPU 16 may map which portions of a composite frame are from which layer. In examples where image content for one or more of the layers changed, but not necessarily for all layers, CPU 16 may cause display processor 26 to update only the portion of the display buffer that stores image content for the layers that changed. The hardware of display panel 28 may then read out the image content in the order in which it is stored in the display buffer to refresh display panel 28.

In some examples, display panel 28 may be a smart panel that includes memory for the display buffer but is further configured to read image content from the display buffer from arbitrary locations. For instance, in the above example where display panel 28 included a display buffer, display panel 28 may be considered as a smart display panel. In examples where display panel 28 includes a display buffer and the display buffer can be read from arbitrary locations, display panel 28 may be considered as a smart display panel capable of scattered blocks scan out.

For examples where display panel 28 is a smart display panel capable of scattered blocks scan out, similar to a GPU pixel block table, CPU 16 and/or display processor 26 may generate a display pixel block table. In such examples, display processor 26 may store composite image content for the layers in arbitrary locations of the display buffer, and the display pixel block table may indicate the order in which the image content stored in the display buffer is to be arranged on display panel 28. Hardware of display panel 28 may receive the display pixel block table and arrange the image content on display panel 28 in the manner indicated by the display pixel block table.

In this disclosure, the example techniques are described with respect to scrolling image content as one example of image content displacement simply for ease and should not be considered limiting. The example techniques described in this disclosure may be applicable to a wide variety of different cases. As one example, in examples where the user is zooming in or zooming out of image content, CPU 16 may increase the throughputs of GPU 18 and display processor 26 to account for the fast change in the image content. CPU 16, GPU 18, and display processor 26 may implement one or more of the example techniques described in this disclosure to ensure that GPU 18 is capable of generating the graphics data for a frame at sufficiently high throughput rate, and display processor 26 is capable of refreshing display panel 28 to achieve the higher display refresh rate when the user is zooming in and out of image content.

As another example, CPU 16 may execute an application that allows the user to include fast moving graphics. CPU 16, GPU 18, and display processor 26 may implement one or more of the example techniques described in this disclosure to ensure that GPU 18 is capable of generating the graphics data for a frame at sufficiently high throughput rate, and display processor 26 is capable of refreshing display panel 28 to achieve the higher display refresh rate so that the moving graphics appears to move smoothly. For example, if GPU 18 is causing frame delay by not generating graphics data fast enough, and therefore impacting refresh rate, then there may be impact in whether the image content scrolls smoothly or not. There may be other example uses for the example techniques described in this disclosure, and interaction with a GUI or scrolling image content is merely one example to assist with understanding.

Furthermore, the example techniques may be iterative. For instance, after GPU 18 stores graphics data for the current frame, the current frame becomes a previous frame and there is a new current frame for which GPU 18 generates graphics data. CPU 16 may update the GPU pixel block table frame-by-frame to indicate the order of the graphics data. CPU 16 or display processor 26 may similarly update the display pixel block table frame-by-frame.

Accordingly, in one or more examples, processing circuitry (e.g., any one or any combination of CPU 16, GPU 18, and display processor 26) may determine an amount of displacement of image content relative to a position of the image content in a displayed first frame on display panel 28.

For example, CPU 16, via a window manager or information from a touch controller, may determine an amount of displacement of image content relative to a position of the image content in the first frame. The processing circuitry may determine a portion of application buffer 32 having obsolete data based on the determined displacement of the image content. In some examples, the obsolete data is data stored in application buffer 32 for image content that is no longer to be displayed.

The processing circuitry may instruct GPU 18 to render graphics data for image content of a second frame that is different than the image content of the first frame to the determined portion of application buffer 32 without causing GPU 18 to re-render graphics data for image content of the second frame that is the same as image content of the first frame (e.g., same image content but in different location due to displacement). For example, the processing circuitry may cause GPU 18 to render only the graphics data corresponding to the new image content in the second frame without re-rendering all of the other graphics data that is same. In this example, new image content means image content that is not present in the first frame, and the other graphics data means image content that is present in the first frame and the second frame, even if the image content is not located in the same position in the first frame and the second frame.

FIGS. 2A-2C are conceptual diagrams illustrating examples of scrolling image content as part of a graphical user interface (GUI). As one example, display panel 28 may be initially displaying a first frame of the image content shown in FIG. 2A. For example, GPU 18 may render graphics data from a first application for static image content 34A, which forms a first layer. GPU 18 may render graphics data from a second application for static image content 34B, which forms a second layer. GPU 18 may render graphics data from a third application for scrolling image content 36A-36D in the example of FIG. 2A. Display processor 26 may composite (e.g., blend or stitch) the first, second, and third layers to generate a composite frame for display on display panel 28.

In the example in FIGS. 2A-2C, scrolling image content 36A-36F is shown as discrete boxes to represent portions of the image content that changes from frame-to-frame. Each one of scrolling image content 36A-36F may represent a minimum amount of image content that is displaced frame-to-frame, as one example. However, image content having a size more than one of image content 36A-36F may be displaced frame-to-frame. Also, the sizes of image content 36A-36F may be the same or may be different.

FIG. 2B represents an instance in time after FIG. 2A, where the image content is displaced upwards relative to a position of the image content in the frame displayed in FIG. 2A. Accordingly, for FIG. 2B, display panel 28 may display a second frame that occurred after the first frame. In the second frame, scrolling image content 36B-36D all were displaced upwards relative to a position of image content 36B-36D in FIG. 2A. Scrolling image content 36A is no longer displayed, and scrolling image content 36E is the new image content.

In one or more examples, GPU 18 may not re-render graphics data corresponding to image content for static image content 34A and 34B, or re-render graphics data corresponding to image content 36B-36D for the second frame. Rather, GPU 18 may render graphics data corresponding to image content 36E, which requires less processing power and time then to re-render all of scrolling image content 36B-36E. In some examples, GPU 18 may render the graphics data corresponding to image content 36E in portions of application buffer 32 that stored the graphics data corresponding to image content 36A, i.e., by overwriting image content 36A with image content 36E in application buffer 32. The graphics data corresponding to image content 36A is obsolete since image content 36A is not viewable, and its graphics data in application buffer 32 can be rewritten over with the graphics data for scrolling image content 36E, i.e., such that image content 36E overwrites image content 36A in application buffer 32. Accordingly, GPU 18 may be configured to store graphics data in arbitrary memory locations in application buffer 32 rather than always re-rendering all graphics data and storing the graphics data that corresponds to contiguous image content in memory locations of application buffer 32 having contiguous virtual addresses.

GPU 18 may not re-render scrolling image content 36B-36D for the second frame. This may mean that the location of where the graphics data, for scrolling image content 36B-36D, is stored in application buffer 32 did not change. However, the location of where scrolling image content 36B-36D is to be displayed on display panel 28 changed from the first frame to the second frame, especially relative to static image content 34A and static image content 34B. For example, in the second frame, scrolling image content 36B abuts static image content 34A, but in the first frame image content 36B and static image content 34A are separated by scrolling image content 36A. In one or more examples, CPU 16 may generate information (e.g., a GPU pixel block table) that indicates the relative arrangement of the graphics data in application buffer 32 so that display processor 26 can generate image content in the correct order.

FIG. 2C represents an instance in time after FIG. 2B, where a user further scrolled image content upwards. Accordingly, for FIG. 2C, display panel 28 may display a third frame that occurred after the second frame. In the third frame, scrolling image content 36C-36E all were displaced upwards relative to a position of image content 36C-36E in FIG. 2B. Scrolling image content 36B is no longer displayed, and scrolling image content 36F is the new image content.

In one or more examples, GPU 18 may not re-render graphics data corresponding to image content for static image content 34A and 34B, or re-render graphics data corresponding to image content 36C-36E for the second frame. Rather, GPU 18 may render graphics data corresponding to image content 36F, which requires less processing power and time then to re-render all of scrolling image content 36C-36F. In some examples, GPU 18 may render the graphics data corresponding to image content 36F in portions of application buffer 32 that stored the graphics data corresponding to image content 36B, i.e., by overwriting image content 36B with image content 36F in application buffer 32. The graphics data corresponding to image content 36B is obsolete since image content 36B is not viewable, and its graphics data in application buffer 32 can be rewritten over with the graphics data for scrolling image content 36F.

GPU 18 may not re-render scrolling image content 36C-36E for the third frame. This may mean that the location of where the graphics data, for scrolling image content 36C-36E, is stored in application buffer 32 did not change. However, the location of where scrolling image content 36C-36E is to be displayed on display panel 28 changed from the second frame to the third frame, especially relative to static image content 34A and static image content 34B. For example, in the third frame, scrolling image content 36C abuts static image content 34A, but in the second frame image content 36C and static image content 34A are separated by scrolling image content 36B. Similar to above, in one or more examples, CPU 16 may update information (e.g., update the GPU pixel block table) that indicates the relative arrangement of the graphics data in application buffer 32 so that display processor 26 can generate image content in the correct order. Again, the GPU pixel block table may indicate which lines of image content are associated with which portions of application buffer 32.

Figure 3A:
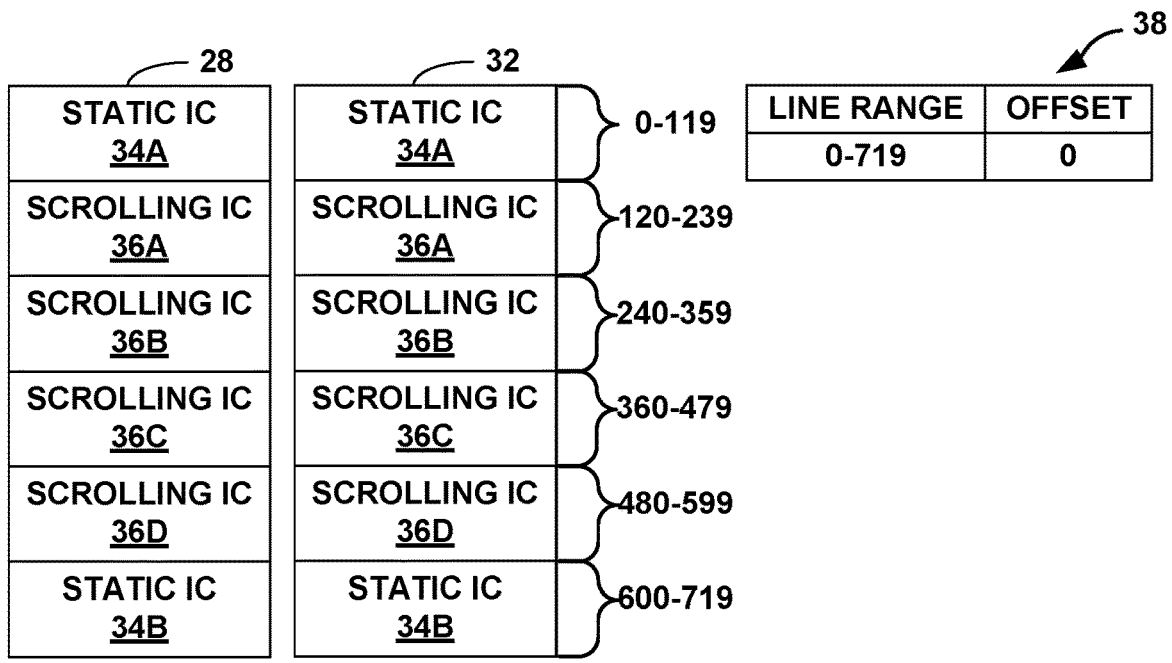
FIGS. 3A-3C are conceptual diagrams illustrating example mappings of portions of an application buffer and portions of a display panel.
Figure 3B:
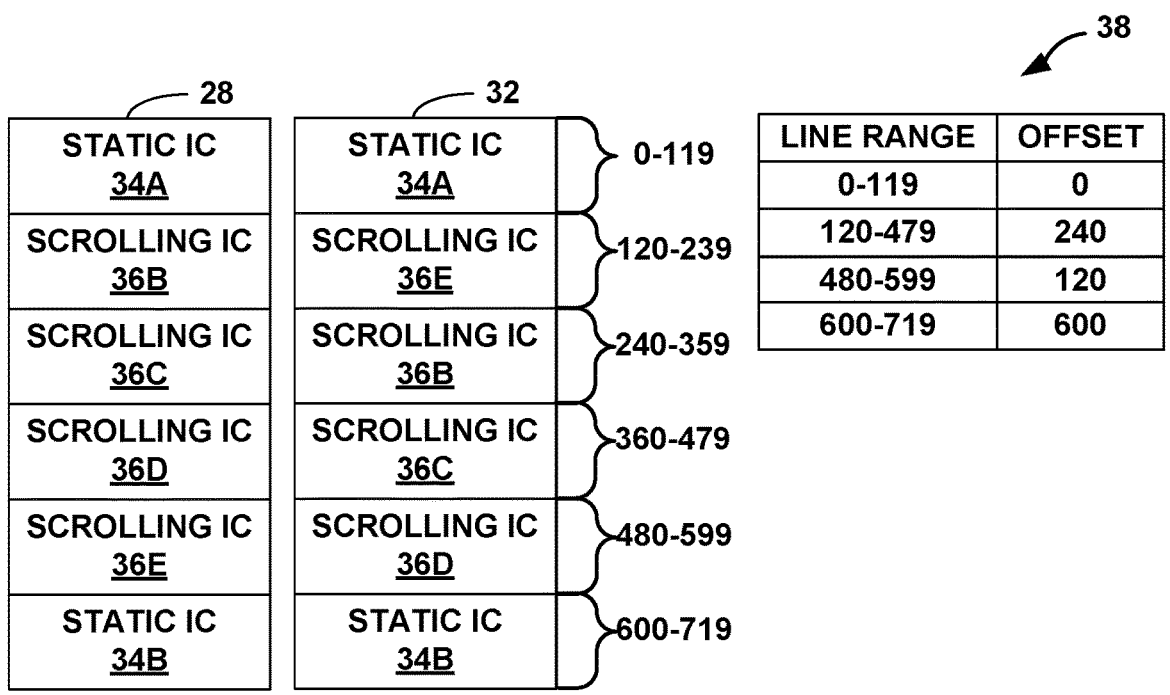
Figure 3C:
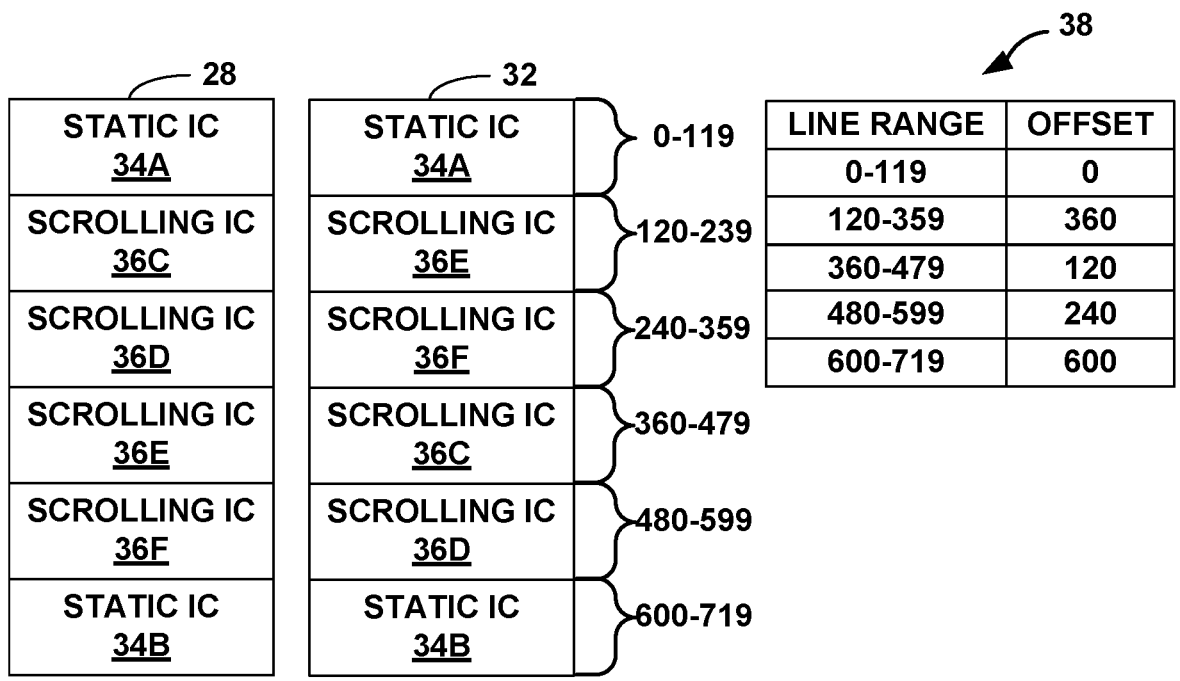

FIGS. 3A-3C are conceptual diagrams illustrating example mapping of portions of an application buffer and portions of a display panel. Each one of FIGS. 3A-3C illustrates display panel 28, application buffer 32, and GPU pixel block table 38 for a first, second, and third frame, respectively. In this example, assume that the size of the image content displayed on display panel 28 is 720 lines.

As illustrated in FIG. 3A, for the first frame, display panel 28 displays static image content 34A, followed by scrolling image content 36A-36D, and static image content 34B. Applicant buffer 32 stores graphics content corresponding to static image content 34A, scrolling image content 36A-36D, and static image content 34B in memory locations assigned contiguous virtual addresses.

For ease, assume that the contiguous virtual addresses range from 0 to 720, such that each contiguous virtual address corresponds to one line of the image content. Contiguous virtual addresses ranging from 0 to 720 such that each contiguous virtual address corresponds to one line of the image content is an example merely to ease with understanding. The example techniques are not so limited.

In this example, memory locations in application buffer 32 with virtual addresses of 0-119 may store static image content 34A, memory locations in application buffer 32 with virtual addresses of 120-239 may store scrolling image content 36A, memory locations in application buffer 32 with virtual addresses of 240-359 may store scrolling image content 36B, memory locations in application buffer 32 with virtual addresses of 360-479 may store scrolling image content 36C, memory locations in application buffer 32 with virtual addresses of 480-599 may store scrolling image content 36D, and memory locations in application buffer 32 with virtual addresses of 600-719 may store static image content 34B. In FIGS. 3A-3C, the graphics data for static image content 34A, scrolling image content 36A-36F, and static image content 34B does not necessarily have to be stored in physical locations that are contiguous in application buffer 32. Rather, CPU 16 may assign contiguous virtual addresses within application buffer 32. However, it may be possible for the graphics data to be stored in contiguous storage locations within application buffer 32.

In FIG. 3A, GPU pixel block table 38 stores information indicating that the line range is 0-719 with 0 offset. The line range refers to a consecutive number of lines of image content. The offset refers to offset that is added to the beginning of the virtual addresses to determine from where display processor 26 is to read graphics data. In this way, GPU pixel block table 38 shows mapping between where image content is to be displayed (e.g., order in which the image content is to be displayed) and the virtual address for where the corresponding graphics data is stored in application buffer 32.

GPU pixel block table 38 storing information indicating line range of 0-710 with 0 offset may mean that the 720 lines of the image content can be generated based on the order of the virtual addresses of the memory location in which the graphics data is stored in application buffer 32. For example, display processor 26 may generate image content based on the graphics data, and arrange the image content in the virtual line address order in which the graphics data is stored. For instance, display processor 26 may read graphics data in a particular scan order, where the scan order is based on the order in which the image content is to be arranged. In FIG. 3A, display processor 26 may read in the graphics data from application buffer 32 in the order of the virtual addresses, without any modification.

In FIG. 3B, for the second frame, there may be upwards displacement of image content for scrolling image content 36B-36D relative to a position of image content 36B-36D in FIG. 3A, and new image content for scrolling image content 36E, as illustrated with respect to display panel 28. In one or more examples, CPU 16, which is an example of processing circuitry, may determine an amount of displacement of the image content for the displayed first frame to determine how much of the new image content is displayed. For example, CPU 16 may determine that there was sufficient displacement of the image content of the first frame to include scrolling image content 36E into the second frame, and exclude image content 36A from the second frame.

CPU 16 may also determine which portions of application buffer 32 store obsolete data based on the determined displacement. GPU 18 may render graphics data for image content 36E in portions of application buffer 32 that store obsolete data, such as the portion previously storing image content 36A. For example, the graphics data for scrolling image content 36A is no longer needed because scrolling image content 36A is not visible. Accordingly, GPU 18 may render graphics data for image content 36E in the portion of application buffer 32 that was used for scrolling image content 36A, i.e., by overwriting image content 36A with image content 36E in application buffer 32. In FIG. 3A, image content 36A was stored in memory location having virtual addresses of 120-239 in application buffer 32. Accordingly, GPU 18 may render graphics data for image content 36E into memory locations having virtual addresses of 120-239 of application buffer 32, as illustrated in FIG. 3B.

In FIG. 3B, if display processor 26 were to arrange the image content based on the order of the virtual addresses of the memory locations that store graphics data in application buffer 32, then the image content on display panel 28 would be incorrect. For instance, display processor 26 may arrange scrolling image content 36E above scrolling image content 36B because the virtual address for the memory locations that store graphics data for image content 36E is less than the virtual address for the memory locations that store graphics data for scrolling image content 36B.

Accordingly, CPU 16 may update GPU pixel block table 38 to indicate the order in which the image content should be arranged based on the corresponding graphics data stored in application buffer 32. CPU 16 may update GPU pixel block table 38 that indicates which lines of image content are associated with which portions of application buffer 32 based on GPU 18 rendering graphics data to the portion of application buffer 32 that stored obsolete data and the locations of the image content of the second frame. One example way to update GPU pixel block table 38 is to generate information for offsets in a virtual address for application buffer 32 to indicate where graphics data for lines of image content are stored in application buffer 32.

For example, CPU 16 may update the GPU pixel block table 38 illustrated in FIG. 3A to the GPU pixel block table 38 illustrated in FIG. 3B. In GPU pixel block table 38, lines 0-119 of the image content (e.g., line range 0-119 in GPU pixel block table 38) correspond to static image content 34A. Static image content 34A is stored in memory locations in application buffer 32 having virtual addresses of 0-119.

Therefore, no offset (e.g., 0 offset in GPU pixel block table 38) is needed, and display processor 26 may read graphics data from memory locations of application buffer 32 having virtual addresses of 0-119.

However, the image content for lines 120-479 (e.g., for where scrolling image content 36B-36D is on display panel 28) is not stored in memory locations of application buffer having virtual addresses starting at 120. Rather, the memory locations for the image content for lines 120-479 have virtual addresses of 240-599. For example, in FIG. 3B, the virtual addresses for the memory locations that store graphics data for static image content 34A is 0-119, the virtual address for the memory locations that store graphics data for scrolling image content 34E is 120-239, and so forth. Accordingly, the virtual addresses for the memory locations of application buffer 32 that store image content for lines 120-479, which corresponds to scrolling image content 36B-36D, start with a virtual address having an offset of 240 (e.g., virtual address 240). Therefore, in FIG. 3B, GPU pixel block table 38 shows an offset of 240 for line range 120-479. Display processor 26 may read graphics data starting from the memory locations having virtual addresses 240-599 to generate scrolling image content 36B-36D.

On display panel 28, after scrolling image content 36D, the next image content is scrolling image content 36E. Scrolling image content 36D finished at line 479. Accordingly, scrolling image content 36E has a line range of 480-599. The graphics data for scrolling image content 36E is stored in memory locations having virtual addresses of 120-239. Therefore, to generate the image content for lines 480-599, which corresponds to scrolling image content 36E, display processor 26 may read graphics data from memory locations having virtual addresses of 120-239. In this case, for line range 480-599, GPU pixel block table 38 shows an offset of 120.

After scrolling image content 36E, display panel 28 displays static image content 34B. The line range for static image content 34B is 600-719. Also, memory locations of application buffer 32 having virtual addresses of 600-719 store the graphics data for static image content 34B. Therefore, for line range 600-719, GPU pixel block table 38 shows an offset of 600. Display processor 26 may read graphics data from memory locations of application buffer 32 having virtual addresses of 600-719 to generate the image content for static image content 34B.

In FIG. 3C, for the third frame, there may be further upward displacement of image content for scrolling image content 36C-36E relative to a position of image content 36C-36E in FIG. 3B, and new image content for scrolling image content 36F, as illustrated with respect to display panel 28. In one or more examples, GPU 18 may render graphics data for image content 36F in portions of application buffer 32 that store obsolete data. For example, the graphics data for scrolling image content 36B is no longer needed because scrolling image content 36B is not visible. Accordingly, GPU 18 may render graphics data for image content 36F in the portion of application buffer 32 that was used for scrolling image content 36B, i.e., by overwriting image content 36B with image content 36F in application buffer 32. In FIG. 3B, image content 36B was stored in memory location having virtual addresses of 240-379 in application buffer 32. Accordingly, GPU 18 may render graphics data for image content 36F into memory locations having virtual addresses of 240-379 of application buffer 32, overwriting image content 36B, as illustrated in FIG. 3C.

In FIG. 3C, if display processor 26 were to arrange the image content based on the order of the virtual addresses of the memory locations that store graphics data in application buffer 32, then the image content on display panel 28 would be incorrect. For instance, display processor 26 may arrange scrolling image content 36E and 36F above scrolling image content 36C because the virtual address for the memory locations that store graphics data for image content 36E and 36F is less than the virtual address for the memory locations that store graphics data for scrolling image content 36C. Also, scrolling image content 36E would be above scrolling image content 36F because the virtual addresses for the memory locations that store graphics data for image content 36E is less than the virtual addresses for the memory locations that store graphics data for image content 36F.

Accordingly, CPU 16 may update GPU pixel block table 38 to indicate the order in which the image content should be arranged based on the corresponding graphics data stored in application buffer 32. Similar to above, CPU 16 may update GPU pixel block table 38 that indicates which lines of image content are associated with which portions of application buffer 32 based on GPU 18 rendering graphics data to the portion of application buffer 32 that stored obsolete data and the locations of the image content of the second frame. One example way to update GPU pixel block table 38 is to generate information for offsets in a virtual address for application buffer 32 to indicate where graphics data for lines of image content are stored in application buffer 32.

For example, CPU 16 may update the GPU pixel block table 38 illustrated in FIG. 3B to the GPU pixel block table 38 illustrated in FIG. 3C. In GPU pixel block table 38, lines 0-119 of the image content (e.g., line range 0-119 in GPU pixel block table 38) correspond to static image content 34A. Static image content 34A is stored in memory locations in application buffer 32 having virtual addresses of 0-119. Therefore, no offset (e.g., 0 offset in GPU pixel block table 38) is needed, and display processor 26 may read graphics data from memory locations of application buffer 32 having virtual addresses of 0-119.

However, the image content for lines 120-359 (e.g., for where scrolling image content 36C and 36D is on display panel 28) is not stored in memory locations of application buffer having virtual addresses starting at 120. Rather, the memory locations for the image content for lines 120-359 have virtual addresses of 360-599. For example, in FIG. 3C, the virtual addresses for the memory locations that store graphics data for static image content 34A is 0-119, the virtual address for the memory locations that store graphics data for scrolling image content 34E is 120-239, and so forth. Accordingly, the virtual addresses for the memory locations of application buffer 32 that store image content for lines 120-359, which corresponds to scrolling image content 36C and 36D, start with a virtual address having an offset of 360 (e.g., virtual address 360). Therefore, in FIG. 3C, GPU pixel block table 38 shows an offset of 360 for line range 120-359. Display processor 26 may read graphics data starting from the memory locations having virtual addresses 360-599 to generate scrolling image content 36C and 36D.

On display panel 28, after scrolling image content 36D, the next image content is scrolling image content 36E. Scrolling image content 36D finished at line 359. Accordingly, scrolling image content 36E has a line range of 360-479. The graphics data for scrolling image content 36E is stored in memory locations having virtual addresses of 120-239. Therefore, to generate the image content for lines 360-479, which corresponds to scrolling image content 36E, display processor 26 may read graphics data from memory locations having virtual addresses of 120-239. In this case, pixel block table 38 shows an offset of 120 for image content 36E.

On display panel 28, after scrolling image content 36E, the next image content is scrolling image content 36F. Scrolling image content 36E finished at line 479. Accordingly, scrolling image content 36F has a line range of 480-599. The graphics data for scrolling image content 36F is stored in memory locations having virtual addresses of 240-359. Therefore, to generate the image content for lines 480-599, which corresponds to scrolling image content 36F, display processor 26 may read graphics data from memory locations having virtual addresses of 240-359. In this case, pixel block table 38 shows an offset of 240 for image content 36F.

In some examples, rather than having line range of 360-479, with offset 120, and line range 480-599, with offset 240, GPU pixel block table 38 may include line range of 360-599, with offset of 120.

After scrolling image content 36F, display panel 28 displays static image content 34B. The line range for static image content 34B is 600-719. Also, memory locations of application buffer 32 having virtual addresses of 600-719 store the graphics data for static image content 34B. Therefore, for line range 600-719, GPU pixel block table 38 shows an offset of 600. Display processor 26 may read graphics data from memory locations of application buffer 32 having virtual addresses of 600-719 to generate the image content for static image content 34B.

Accordingly, the example of FIGS. 3A-3C illustrate the contents of application buffer 32 represented as virtually contiguous graphics data. In this example, application buffer 32 is logically divided into blocks of size corresponding to 120 lines of display panel 28. For instance, in FIGS. 3A-3C, application buffer 32 includes six logical blocks. CPU 16 may determine the size and number of logical blocks of application buffer 32, and determine the mapping between image content on display panel 28 and where the corresponding graphics data is stored in application buffer 32. For instance, GPU pixel block table 38 may include the mapping information between image content on display panel 28 and where its corresponding graphics data is stored in application buffer 32.

In the example techniques described in this disclosure, GPU 18 may be configured to store graphics data at arbitrary memory locations of application buffer 32. Furthermore, display processor 26 may be configured to read graphics data from arbitrary memory locations of application buffer 32. For example, the GPU pixel block table 38 may indicate from where display processor 26 is to read graphics data to generate image content that is ordered correctly on display panel 28.

Furthermore, in some examples, based on the capabilities of display panel 28, CPU 16 may generate another display pixel block table that display panel 28 uses for retrieving image content from arbitrary locations for reconstructing the image content. Display panel 28 may operate in a video mode panel or smart mode panel (also called command mode panel).

In the video mode panel, display panel 28 does not include any of its own memory, and display processor 26 may continuously refresh display panel 28. As an example, for the first frame, illustrated in FIG. 3A, display processor 26 may read the graphics data per GPU pixel block table 38 and refresh display panel 28. Then, for the second frame, illustrated in FIG. 3B, display processor 26 may read all of the graphics data per GPU pixel block table 38 and refresh display panel 28. Although most of the image content in the second frame was the same as the image content in the first frame, display processor 26 may still refresh display panel 28 with all of the image content of the second frame.

Then, for the third frame, illustrated in FIG. 3C, display processor 26 may read all of the graphics data per GPU pixel block table 38 and refresh display panel 28. Similar to above, although most of the image content in the third frame was the same as the image content in the second frame, display processor 26 may still refresh display panel 28 with all of the image content of the third frame because display panel 28. Display processor 26 may refresh display panel 28 with all of the image content although some of the image content was the same because display panel 28, in the video panel mode, does not include its own display memory to store image content that is the same frame-to-frame.

In the smart panel mode, display panel 28 includes a display buffer that can store image content. For the smart panel mode, subsequent to display processor 26 generating the image content for a second frame (e.g., that of FIG. 3B), display processor 26 or CPU 16 may determine a difference in the image content of the first frame (e.g., that of FIG. 3A) and the second frame. Display processor 26 may update image content in the display buffer based on the determined difference in the image content of the first frame and the image content of the second frame. This way, display processor 26 may not need to rewrite all of the image content to the display buffer and can write to the display buffer only image content that changed, which may speed up the display of image content. For example, display processor 26 may retrieve from application buffer 32 graphics data corresponding only to the image content that changed from frame-to-frame.

In some examples of smart panel mode, although display panel 28 includes a display buffer, the hardware of display panel 28 may be configured to scan out all of the image content stored in the display buffer for each refresh cycle. In other words, each time that display panel 28 is to be refreshed, the hardware of display panel 28 may scan all of the display buffer. For example, the hardware of display panel 28 may not be configured to read image content from arbitrary locations of the display buffer and may scan all of the display buffer every time display panel 28 is refreshed.

However, in some examples of smart panel mode, referred to as a smart display panel capable of scattered scan out, the hardware of display panel 28 may be configured to read image content from arbitrary locations of the display buffer. As one example, CPU 16, via a display driver, or display processor 26 may generate a display pixel block table. Similar to the GPU pixel block table, the display pixel block table may indicate where image content stored in the display buffer is to be displayed on the display panel (e.g., based on a similar virtual addressing scheme described above). In such examples, the hardware of display panel 28 may display image content based on the image content stored in the display buffer and the display pixel block table.

Figure 4:
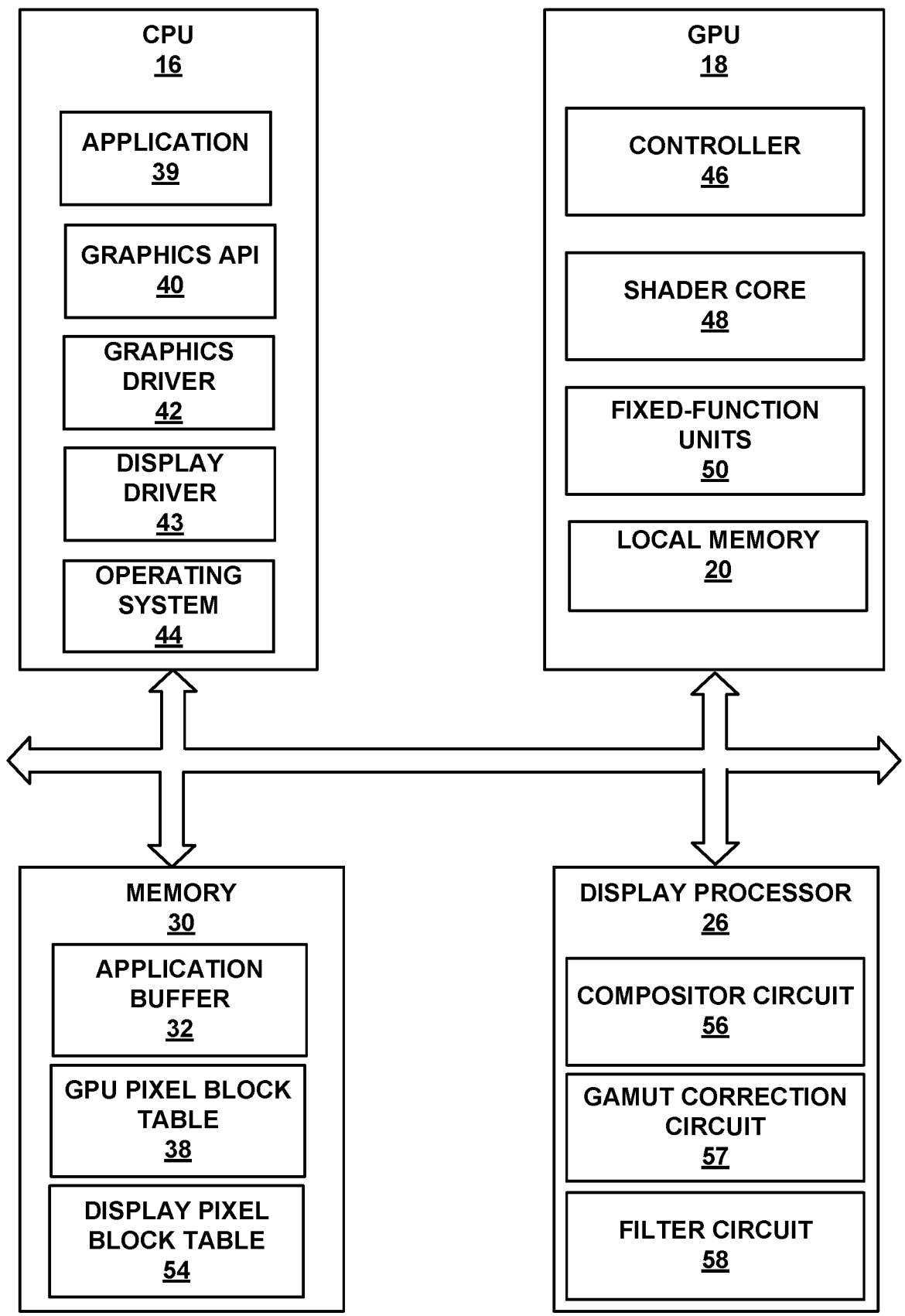
FIG. 4 is a block diagram illustrating a central processing unit (CPU), a graphics processing unit (GPU), a display processor, and system memory of FIG. 1 in more detail.

FIG. 4 is a block diagram illustrating CPU 16, GPU 18, display processor 26, and system memory 30 of FIG. 1 in more detail. As shown in FIG. 4, CPU 16, GPU 18, display processor 26, and memory 30 are communicatively coupled to one another. CPU 16, GPU 18, and display processor 26 may be integrated with one another forming a system on chip (SoC).

As illustrated in FIG. 4, CPU 16 is configured to execute application 39, a graphics application programming interface (API) 40, a graphics driver 42, a display driver 43, and an operating system 44. In the example of FIG. 4, GPU 18 includes a controller 46, shader core 48, and one or more fixed-function processing units 50. For ease, local memory 20 is also illustrated as being a part of GPU 18 but may be external as well.

Software application 39 may include at least some of one or more instructions that cause graphic content to be displayed or one or more instructions that cause a non-graphics task (e.g., a general-purpose computing task) to be performed on GPU 18. Software application 39 may issue instructions to graphics API 40. Graphics API 40 may be a runtime service that translates the instructions received from software application 39 into a format that is consumable by graphics driver 42. In some examples, graphics API 40 and graphics driver 42 may be part of the same software service.

Graphics driver 42 receives the instructions from software application 39, via graphics API 40, and controls the operation of GPU 18 to service the instructions. For example, graphics driver 42 may formulate one or more command streams, place the command streams into memory 30, and instruct GPU 18 to execute command streams. Graphics driver 42 may place the command streams into memory 30 and communicate with GPU 18 via operating system (OS) 44 (e.g., via one or more system calls).

In one or more examples, OS 44 may be configured to reserve memory locations in memory 30 for application buffer 32. OS 44 may determine the size of the memory locations in application buffer 32, and may also determine the virtual memory addresses for the memory locations in application buffer 32. However, other components of CPU 16 may determine the size of the memory locations of application buffer 32 and their respective virtual addresses.

Controller 46 is configured to retrieve the commands stored in the command streams, and dispatch the commands for execution on shader core 48 and one or more fixed-function units 50. Controller 46 may dispatch commands from a command stream for execution on one or more fixed-function units 50 or a subset of shader core 48 and one or more fixed-function units 50. Controller 46 may be hardware of GPU 18, may be software or firmware executing on GPU 18, or a combination of both.

Shader core 48 includes programmable circuitry (e.g., processing cores on which software executes). One or more fixed-function units 50 include fixed function circuitry configured to perform limited operations with minimal functional flexibility. Shader core 48 and one or more fixed-function units 50 together form a graphics pipeline configured to perform graphics processing.

Shader core 48 may be configured to execute one or more shader programs that are downloaded onto GPU 18 from CPU 16. A shader program, in some examples, may be a compiled version of a program written in a high-level shading language (e.g., an OpenGL Shading Language (GLSL), a High Level Shading Language (HLSL), a C for Graphics (Cg) shading language, etc.). In some examples, shader core 48 may include a plurality of processing units that are configured to operate in parallel (e.g., a SIMD pipeline). Shader core 48 may have a program memory that stores shader program instructions and an execution state register (e.g., a program counter register) that indicates the current instruction in the program memory being executed or the next instruction to be fetched. Examples of shader programs that execute on shader core 48 include, for example, vertex shaders, pixel shaders (also referred to as fragment shaders), geometry shaders, hull shaders, domain shaders, compute shaders, and/or unified shaders.

Fixed-function units 50 may include hardware that is hard-wired to perform certain functions. Although the fixed function hardware may be configurable, via one or more control signals, for example, to perform different functions, the fixed function hardware typically does not include a program memory that is capable of receiving user-compiled programs. In some examples, one or more fixed-function units 50 may include, for example, processing units that perform raster operations (e.g., depth testing, scissors testing, alpha blending, etc.).

Graphics driver 42 of CPU 16 may be configured to write the command streams to memory 30, and controller 46 of GPU 18 may be configured to read the one or more commands of command streams from memory 30. In some examples, one or both of command streams may be stored as a ring buffer in memory 30. A ring buffer may be a buffer with a circular addressing scheme where CPU 16 and GPU 18 maintain synchronized state variables associated with the writing of data to and reading of data from the ring buffer. For example, if the first command stream is a ring buffer, each of CPU 16 and GPU 18 may store a write pointer indicating the next address to be written to in the ring buffer, and a read pointer indicating the next address to be read from in the ring buffer.

When CPU 16 writes a new command to the ring buffer, CPU 16 may update the write pointer in CPU 16 and instruct GPU 18 to update the write pointer in GPU 18. Similarly, when GPU 18 reads a new command from the ring buffer, GPU 18 may update the read pointer in GPU 18 and instruct CPU 16 to update the read pointer in CPU 16. Other synchronization mechanisms are possible. When the read and/or write pointers reach a highest address in the range of addresses allocated for the ring buffer, the read and/or write pointers may wrap around to the lowest address to implement a circular addressing scheme.

Example operation of an example graphics driver 42 and an example GPU controller 46 will now be described with respect to FIG. 4. Graphics driver 42 receives one or more instructions from software application 39 that specify graphics operations and/or general-purpose computing operations to be performed by GPU 18. Graphics driver 42 places the output command stream into memory 30, which is accessible by GPU controller 46. Graphics driver 42 notifies GPU controller 46 that the command stream corresponding to software application 39 is available for processing. For example, graphics driver 42 may write to a GPU register (e.g., a GPU hardware register polled by GPU 18 and/or a GPU memory-mapped register polled by GPU 18) one or more values indicating that the command stream is ready for execution.

Upon notification that the command stream is ready for execution, controller 46 of GPU 18 may determine if resources are currently available on GPU 18 to begin executing the command stream. If resources are available, controller 46 begins to dispatch the commands in the command stream.

As illustrated in FIG. 4, display processor 26 includes compositor circuit 56, gamut correction circuit 57, and filter circuit 58 as a few example circuits to perform various operations. As one example, compositor circuit 56 may blend or stitch the different layers generated by GPU 18 or other components into a composite frame for display. Gamut correction circuit 57 may be configured to compensate for imperfections in the ability of display panel 28 to display a full gamut of colors. Filter circuit 58 may be configured to perform operations such as rotation, shading, or other such operations on the composite image frame prior to output to display panel 28. CPU 16 may execute display driver 43 to control the operations of display processor 26.

In one or more examples, in response to a displacement of image content, CPU 16 may determine an amount of displacement of image content of a displayed first frame, and determine a portion of application buffer 32 having obsolete data based on the determined displacement of the image content. Graphics driver 42 may instruct controller 46 to render graphics data for image content of a second frame that is different than the image content of the first frame to the determined portion of the application buffer without causing GPU 18 to re-render graphics data for image content of the second frame that is same as image content of the first frame.

As one example, CPU 16 may execute a window manager that determines a displacement motion vector indicative of a momentum of user interaction (e.g., how fast and which direction the user displaced the image content). The window manager may receive information indicating the manner in which the user displaced the image content (e.g., length and direction of a user swipe to displace image content) from a touch sensor driver.

Graphics driver 42 may receive the information of the displacement motion vector and determine the amount of displacement of image content based on the motion vector. For example, if the motion vector indicates 60 lines of upward displacement, graphics driver 42 may determine that 60 lines that were on the top of the first frame are now not visible.

Graphics driver 42 may determine where the graphics data for the image content that is no longer visible is stored in application buffer 32. For instance, graphics driver 42 may determine the virtual addresses in application buffer 32 that stored the graphics data for the image content that is no longer displayed. The graphics data for the image content that is no longer displayed is obsolete data. Graphics driver 42 may then instruct controller 46 to render graphics data corresponding to image content of a second frame that is different than the image content of the first frame (e.g., only render the graphics data for the new image content), and not re-render graphics data corresponding to image content of the second frame that is the same as the image content of the first frame.

Graphics driver 42 may also update GPU pixel block table 38 based on GPU 18 rendering graphics data to the determined portion of application buffer 32. For example, graphics driver 42 may generate information for offsets in a virtual address for application buffer 32 to indicate where graphics data for lines of image content are stored in application buffer 32.

Display driver 43 may instruct display processor 26 to generate the image content of the second frame for display on display panel 28 based on the updated GPU pixel block table 38. For example, referring back to FIG. 3C, display driver 43 may instruct display processor 26 to retrieve graphics data from memory locations of application buffer 32 having virtual addresses of 0-119 (e.g., for static image content 34A), followed by memory locations of application buffer 32 having virtual addresses of 360-599 (e.g., for scrolling image content 36C and 36D), followed by memory locations of application buffer 32 having virtual addresses of 120-359 (e.g., for scrolling image content 36E and 36F), and followed by memory locations of application buffer 32 having virtual addresses of 600-719 (e.g., for static image content 34B).

In one or more example, such as in examples where display panel 28 is a smart mode panel, subsequent to display processor 26 generating the image content of the second frame, display driver 43 may determine a difference in the image content of the first frame and second frame. Display driver 43 may update image content in a display buffer of display panel 28 based on the determined difference in the image content of the first frame and the second frame, and cause display panel 28 to display the image content of the second frame based on the image content stored in the display buffer.

In examples where display panel 28 is a smart mode panel with the capability of scattered scan out, display driver 43 may update display pixel block table 54 that indicates where image content stored in the display buffer is to be displayed on display panel 28. In such examples, display driver 43 may cause display panel 28 to display the image content of the second frame based on the image content stored in the display buffer and information in display pixel block table 54.

In this way, display driver 43 may maintain display pixel block table 54 similar to graphics driver 42 maintaining GPU pixel block table 38. However, display pixel block table 54 and GPU pixel block table 38 are independent of one another. GPU pixel block table 38 corresponds to the rendered content generated by the GPU, and display pixel block table 54 corresponds to the composed content generated by display processor 26. Because display processor 26 may process multiple layers, where more than one layer can be updated, GPU pixel block table 38 and display pixel block table 54 may be different, and therefore, updated and maintained separately.

In one or more examples, rather than there being one application buffer 32, there may be a plurality of application buffers (e.g., a first, second, and third application buffer). A first application buffer may store the graphics data corresponding to the image content that is being displayed. A second application buffer may store the graphics data corresponding to the image content that is to be displayed next. A third application buffer may be available to GPU 18 to render graphics data. Then, for the next frame, the second application buffer stores the graphics data corresponding to the image content that is being displayed, the third application buffer stores the graphics data corresponding to the image content that is to be displayed next, and the first application buffer is available to GPU 18 to render graphics data. In this way, each of the three applications buffers circle through as storing graphics data for image content that is being displayed, graphics data for image content that is to be displayed, and storing graphics data being rendered, respectively.

Therefore, there may be a delay between the frame that display panel 28 is displaying and the frame on which GPU 18 is operating. For example, display panel 28 may be displaying a current frame based on graphics data stored in a first application buffer. The second application buffer may store graphics data for image content of the next frame after the current frame being displayed. GPU 18 may be rendering graphics data for image content of a frame following the next frame to the third application buffer.

In such examples, the above example techniques may be applicable without change, but CPU 16 may further track the "buffer age" of each application buffer. For instance, display processor 26 may cause display panel 28 to display the current frame having graphics data stored in a first application buffer. In response to a user scrolling image content up, GPU 18 may render the new image content in a third application buffer. Then, eventually, display processor 26 may cause display panel 28 to display the current frame having graphics data stored in third application buffer, while GPU 18 renders new graphics data into the first application buffer.

In this example, the obsolete data in the first application buffer is the graphics data that exists when GPU 18 was rendering graphics content two frames earlier than the frame for which GPU 18 is rendering graphics data. However, during the time between the rendering graphics data for a frame two frames earlier than the frame for which GPU 18 is rendering graphic data, there may have been more scrolling of image content corresponding to obsolete data in the first application buffer. Therefore, to determine the portion of one of the first, second, or third buffer that stores obsolete data, graphics driver 42 may determine the portion based on information indicative of when the application buffer was previously accessed.

Figure 5:
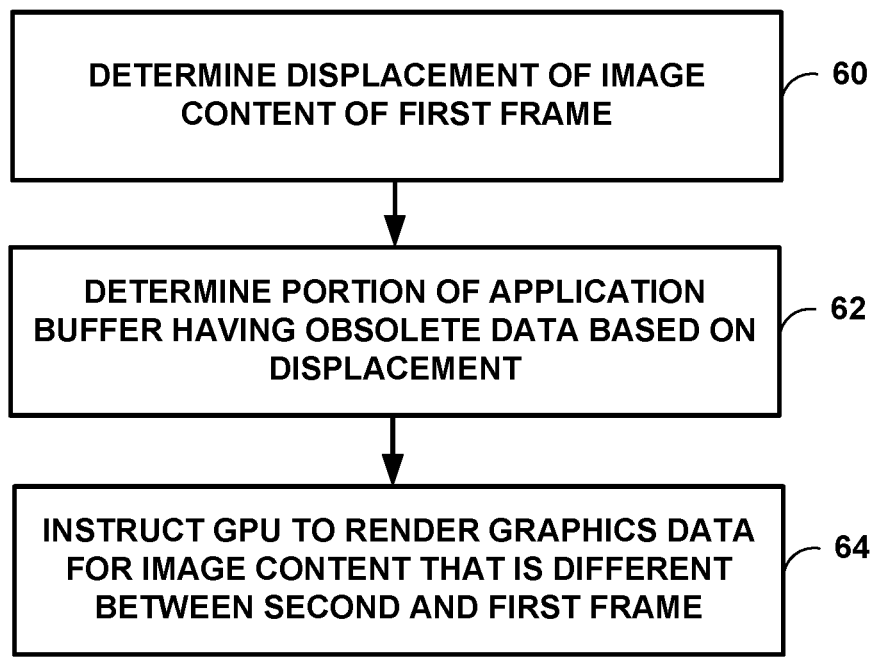
FIG. 5 is a flowchart illustrating an example method of this disclosure.

FIG. 5 is a flowchart illustrating another example method of this disclosure. The techniques of FIG. 5 may be performed by processing circuitry such as one of or any combination of CPU 16, GPU 18, and/or display processor 26.

The processing circuitry may determine an amount of displacement of image content relative to a position of the image content in a displayed first frame (60). For example, CPU 16 may determine a motion vector to indicate magnitude of horizontal or vertical content displacement.

Processing circuitry may determine a portion of application buffer 32 having obsolete data based on the determined displacement of the image content (62). For example, graphics driver 42 may identify obsolete data in application buffer 32 since the last usage of application buffer 32 (e.g., based on information indicative of when application buffer 32 was previously accessed). As described above, in examples where there are a plurality of application buffers, there may be a few iterations of display refresh where image content is displaced frame-to-frame. Accordingly, the obsolete data in one of the plurality of application buffers may not only be based on frame-to-frame changes in the image content, but also based on when that particular application buffer was last used to read graphics data for generating a frame for display. The processing circuitry may use the "buffer age" (e.g., information indicative of when the particular application buffer was previously accessed for generating image content of frame) to determine portions in that application buffer having obsolete data.

The processing circuitry may instruct GPU 18 to render graphics data for image content of a second frame that is different than the image content of the first frame to the determined portion of the application buffer without causing GPU 18 to re-render graphics data for image content of the second frame that is the same as image content of the first frame (64). For example, graphics driver 42 may cause GPU 18 to render the new graphics data into memory locations of application buffer 32 that store the obsolete data.

In some examples, graphics driver 42 may update GPU pixel block table 38 that indicates which lines of image content are associated with which portions of application buffer 32 based on GPU 18 rendering graphics data to the determined portion of application buffer 32. For example, graphics driver 42 may generate information for offsets in a virtual address for application buffer 32 to indicate where graphics data for lines of image content are stored in application buffer 32. Display driver 43 may instruct display processor 26 to generate the image content of the second frame for display on display panel 28 based on updated GPU pixel block table 38.

The processing circuitry, in some examples, may, subsequent to display processor 26 generating the image content of the second frame, determine a difference in the image content of the first frame and second frame. The processing circuitry (e.g., via display driver 43) may update image content in a display buffer based on the determined difference in the image content of the first frame and the second frame, and cause display panel 28 to display the image content of the second frame based on the image content stored in the display buffer. In some examples, the processing circuitry (e.g., via display driver 43) may update display pixel block table 54 indicating where image content stored in the display buffer is to be displayed on display panel 28. In one or more of these examples, to cause display panel 28 to display the image content, the processing circuitry may cause display panel 28 to display the image content of the second frame based on the image content stored in the display buffer and information in display pixel block table 54.

In some cases, the example techniques may provide approximately 54.8 mA of power savings for 60 fps text scrolling on a 1440×2560 LCD panel. The power savings may be the result of reduction in system memory 30 operations on GPU 18 and display processor 26, reduction in processing load on GPU 18 and display processor 26 and reduction in data transfer between system memory 30 and display processor 26.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some examples, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

The invention claimed is:

1. A method for generating image content, the method comprising:
   determining an amount of displacement of image content relative to a position of the image content in a displayed first frame;
   determining a portion of an application buffer having obsolete data based on the determined displacement of the image content, wherein the obsolete data is data stored in the application buffer for image content that is no longer to be displayed;
   instructing a graphics processing unit (GPU) to render graphics data for image content of a second frame that is different than the image content of the first frame to the determined portion of the application buffer without causing the GPU to re-render graphics data for image content of the second frame that is the same as image content of the first frame;
   updating a GPU pixel block table that indicates which lines of the image content of the second frame are associated with which portions of the application buffer based on the GPU rendering the graphics data to the determined portion of the application buffer;
   instructing a display processor to generate the image content of the second frame for display on a display panel based on the updated GPU pixel block table, wherein the display processor is configured to output the image content to a display buffer in arbitrary locations of the display buffer;
   determining a difference in the image content of the first frame and the image content of the second frame;
   updating image content in the display buffer based on the determined difference in the image content of the first frame and the image content of the second frame such that only image content that is different between the first frame and second frame is updated in the display buffer, wherein the display buffer is part of the display panel and different than the application buffer; and
   causing the display panel to display the image content of the second frame based on the image content stored in the display buffer.

2. The method of claim 1, wherein updating the GPU pixel block table comprises:
   generating information for offsets in a virtual address for the application buffer to indicate where graphics data for lines of image content are stored in the application buffer.

3. The method of claim 1, further comprising:
   updating a display pixel block table indicating where image content stored in the display buffer is to be displayed on the display panel,
   wherein causing the display panel to display the image content comprises causing the display panel to display the image content of the second frame based on the image content stored in the display buffer and information in the display pixel block table.

4. The method of claim 1, wherein determining the amount of displacement comprises:
   determining a motion vector indicative of a momentum of user interaction; and
   determining the amount of displacement based on the determined motion vector.

5. The method of claim 1, wherein determining the portion comprises determining the portion based on information indicative of when the application buffer was previously accessed.

6. A device for generating image content, the device comprising:
   an application buffer;
   a graphics processing unit (GPU);
   a display processor;
   a display panel comprising a display buffer; and
   processing circuitry configured to:
   determine an amount of displacement of image content relative to a position of the image content in a displayed first frame;
   determine a portion of the application buffer having obsolete data based on the determined displacement of the image content, wherein the obsolete data is data stored in the application buffer for image content that is no longer to be displayed;
   instruct the GPU to render graphics data for image content of a second frame that is different than the image content of the first frame to the determined portion of the application buffer without causing the GPU to re-render graphics data for image content of the second frame that is the same as image content of the first frame;
   update a GPU pixel block table that indicates which lines of the image content of the second frame are associated with which portions of the application buffer based on the GPU rendering the graphics data to the determined portion of the application buffer;
   instruct the display processor to generate the image content of the second frame for display on the display panel based on the updated GPU pixel block table, wherein the display processor is configured to output the image content to the display buffer in arbitrary locations of the display buffer;
   determine a difference in the image content of the first frame and the image content of the second frame;
   update image content in the display buffer based on the determined difference in the image content of the first frame and the image content of the second frame such that only image content that is different between the first frame and second frame is updated in the display buffer, wherein the display buffer is part of the display panel and different than the application buffer; and
   cause the display panel to display the image content of the second frame based on the image content stored in the display buffer.

7. The device of claim 6, wherein to update the GPU pixel block table, the processing circuitry is configured to:
   generate information for offsets in a virtual address for the application buffer to indicate where graphics data for lines of image content are stored in the application buffer.

8. The device of claim 6, wherein the processing circuitry is configured to:
   update a display pixel block table indicating where image content stored in the display buffer is to be displayed on the display panel,
   wherein to cause the display panel to display the image content, the processing circuitry is configured to cause the display panel to display the image content of the second frame based on the image content stored in the display buffer and information in the display pixel block table.

9. The device of claim 6, wherein to determine the amount of displacement, the processing circuitry is configured to:
   determine a motion vector indicative of a momentum of user interaction; and
   determine the amount of displacement based on the determined motion vector.

10. The device of claim 6, wherein to determine the portion, the processing circuitry is configured to determine the portion based on information indicative of when the application buffer was previously accessed.

11. A non-transitory computer-readable storage medium storing instructions that when executed cause one or more processors to:
    determine an amount of displacement of image content relative to a position of the image content in a displayed first frame;
    determine a portion of an application buffer having obsolete data based on the determined displacement of the image content, wherein the obsolete data is data stored in the application buffer for image content that is no longer to be displayed;
    instruct a graphics processing unit (GPU) to render graphics data for image content of a second frame that is different than the image content of the first frame to the determined portion of the application buffer without causing the GPU to re-render graphics data for image content of the second frame that is the same as image content of the first frame;
    update a GPU pixel block table that indicates which lines of the image content of the second frame are associated with which portions of the application buffer based on the GPU rendering the graphics data to the determined portion of the application buffer;
    instruct a display processor to generate the image content of the second frame for display on a display panel based on the updated GPU pixel block table, wherein the display processor is configured to output the image content to a display buffer in arbitrary locations of the display buffer;
    determine a difference in the image content of the first frame and the image content of the second frame;
    update image content in the display buffer based on the determined difference in the image content of the first frame and the image content of the second frame such that only image content that is different between the first frame and second frame is updated in the display buffer, wherein the display buffer is part of the display panel and different than the application buffer; and
    cause the display panel to display the image content of the second frame based on the image content stored in the display buffer.

12. The computer-readable storage medium of claim 11, wherein instructions that cause the one or more processors to update the GPU pixel block table comprise instructions that cause the one or more processors to:
    generate information for offsets in a virtual address for the application buffer to indicate where graphics data for lines of image content are stored in the application buffer.

13. The computer-readable storage medium of claim 11, further comprising instructions that cause the one or more processors to:
 update a display pixel block table indicating where image content stored in the display buffer is to be displayed on the display panel,
 wherein the instructions that cause the one or more processors to cause the display panel to display the image content comprise instructions that cause the one or more processors to cause the display panel to display the image content of the second frame based on the image content stored in the display buffer and information in the display pixel block table.

14. The computer-readable storage medium of claim 11, wherein the instructions that cause the one or more processors to determine the amount of displacement comprise instructions that cause the one or more processors to:
 determine a motion vector indicative of a momentum of user interaction; and
 determine the amount of displacement based on the determined motion vector.

15. The computer-readable storage medium of claim 11, wherein the instructions that cause the one or more processors to determine the portion comprise instructions that cause the one or more processors to determine the portion based on information indicative of when the application buffer was previously accessed.

16. A device for generating image content, the device comprising:
 means for determining an amount of displacement of image content relative to a position of the image content in a displayed first frame;
 means for determining a portion of an application buffer having obsolete data based on the determined displacement of the image content, wherein the obsolete data is data stored in the application buffer for image content that is no longer to be displayed;
 means for instructing a graphics processing unit (GPU) to render graphics data for image content of a second frame that is different than the image content of the first frame to the determined portion of the application buffer without causing the GPU to re-render graphics data for image content of the second frame that is the same as image content of the first frame;
 means for updating a GPU pixel block table that indicates which lines of the image content of the second frame are associated with which portions of the application buffer based on the GPU rendering the graphics data to the determined portion of the application buffer;
 means for instructing a display processor to generate the image content of the second frame for display on a display panel based on the updated GPU pixel block table, wherein the display processor is configured to output the image content to a display buffer in arbitrary locations of the display buffer;
 means for determining a difference in the image content of the first frame and the image content of the second frame;
 means for updating image content in the display buffer based on the determined difference in the image content of the first frame and the image content of the second frame such that only image content that is different between the first frame and second frame is updated in the display buffer, wherein the display buffer is part of the display panel and different than the application buffer; and
 means for causing the display panel to display the image content of the second frame based on the image content stored in the display buffer.

17. The device of claim 16, wherein the means for updating the GPU pixel block table comprises:
 means for generating information for offsets in a virtual address for the application buffer to indicate where graphics data for lines of image content are stored in the application buffer.

18. The device of claim 16, further comprising:
 means for updating a display pixel block table indicating where image content stored in the display buffer is to be displayed on the display panel,
 wherein the means for causing the display panel to display the image content comprises means for causing the display panel to display the image content of the second frame based on the image content stored in the display buffer and information in the display pixel block table.

* * * * *